United States Patent
Baek

(10) Patent No.: US 10,911,169 B2
(45) Date of Patent: Feb. 2, 2021

(54) BOUNCE RATE MEASURING APPARATUS FOR BROADCASTING SERVICE

(71) Applicant: ANYPOINT MEDIA CO., LTD., Seoul (KR)

(72) Inventor: Wonjang Baek, Seongnam-si (KR)

(73) Assignee: ANYPOINT MEDIA CO., LTD., Seoul (KR)

( * ) Notice: Subject to any disclaimer, the term of this patent is extended or adjusted under 35 U.S.C. 154(b) by 0 days.

(21) Appl. No.: 16/894,856

(22) Filed: Jun. 7, 2020

(65) Prior Publication Data

US 2020/0304222 A1    Sep. 24, 2020

Related U.S. Application Data

(63) Continuation of application No. PCT/KR2018/014241, filed on Nov. 20, 2018.

(30) Foreign Application Priority Data

Dec. 18, 2017    (KR) .................. 10-2017-0173750

(51) Int. Cl.
   *H04H 60/33*    (2008.01)
   *H04N 21/24*    (2011.01)
   *H04N 21/258*    (2011.01)

(52) U.S. Cl.
   CPC ........ *H04H 60/33* (2013.01); *H04N 21/2408* (2013.01)

(58) Field of Classification Search
   CPC ............... H04H 60/33; H04N 21/2408; H04N 21/44008; H04N 21/251; H04N 21/2407
   See application file for complete search history.

(56) References Cited

U.S. PATENT DOCUMENTS

| | | | |
|---|---|---|---|
| 8,788,659 B1 * | 7/2014 | Heng ................ | H04L 69/329 709/224 |
| 9,319,290 B1 * | 4/2016 | Lewis ............. | G06Q 30/0201 |

(Continued)

FOREIGN PATENT DOCUMENTS

| | | |
|---|---|---|
| JP | 2014-42124 A | 3/2014 |
| KR | 10-2009-0064142 A | 6/2009 |

(Continued)

OTHER PUBLICATIONS

International Search Report dated Feb. 25, 2019, issued to International Application No. PCT/KR2018/014241.

(Continued)

*Primary Examiner* — Alexander Gee
(74) *Attorney, Agent, or Firm* — Stein IP, LLC

(57) ABSTRACT

There is provided a bounce rate measuring apparatus for measuring a bounce rate of a broadcasting service using service provision information generated based on a viewer's behavior of selecting a channel and leaving the channel. For example, the bounce rate related to a specific channel of the broadcasting service may be measured, the bounce rate related to a specific receiver may be measured, or the bounce rate related to a specific content provided through the broadcasting service may be measured. In addition, it is possible to more efficiently evaluate the quality of the broadcasting service or understand a viewer's interest based on the measured bounce rates of the broadcasting service.

20 Claims, 5 Drawing Sheets

(56) References Cited

U.S. PATENT DOCUMENTS

| | | | |
|---|---|---|---|
| 9,848,215 B1* | 12/2017 | Gordon | H04N 21/233 |
| 2003/0005432 A1* | 1/2003 | Ellis | H04N 21/26283 |
| | | | 725/13 |
| 2012/0317272 A1* | 12/2012 | Funk | H04L 67/025 |
| | | | 709/224 |
| 2015/0220972 A1* | 8/2015 | Subramanya | G06Q 30/0246 |
| | | | 705/14.45 |
| 2016/0132900 A1* | 5/2016 | Duggal | G06Q 30/0201 |
| | | | 705/7.29 |
| 2017/0154356 A1* | 6/2017 | Trevisiol | G06Q 30/0272 |
| 2018/0213291 A1* | 7/2018 | Roman | H04N 21/4826 |
| 2019/0114663 A1* | 4/2019 | Goldman | G06Q 30/0245 |

FOREIGN PATENT DOCUMENTS

| | | |
|---|---|---|
| KR | 10-2014-0046902 A | 4/2014 |
| KR | 10-2015-0004685 A | 1/2015 |
| KR | 10-1751708 B1 | 7/2017 |
| KR | 10-2081221 B1 | 2/2020 |
| WO | WO 2017/119604 A1 | 7/2017 |

OTHER PUBLICATIONS

Korean Office Action dated Sep. 6, 2019, issued to Korean Application No. 10-2017-0173750.

* cited by examiner

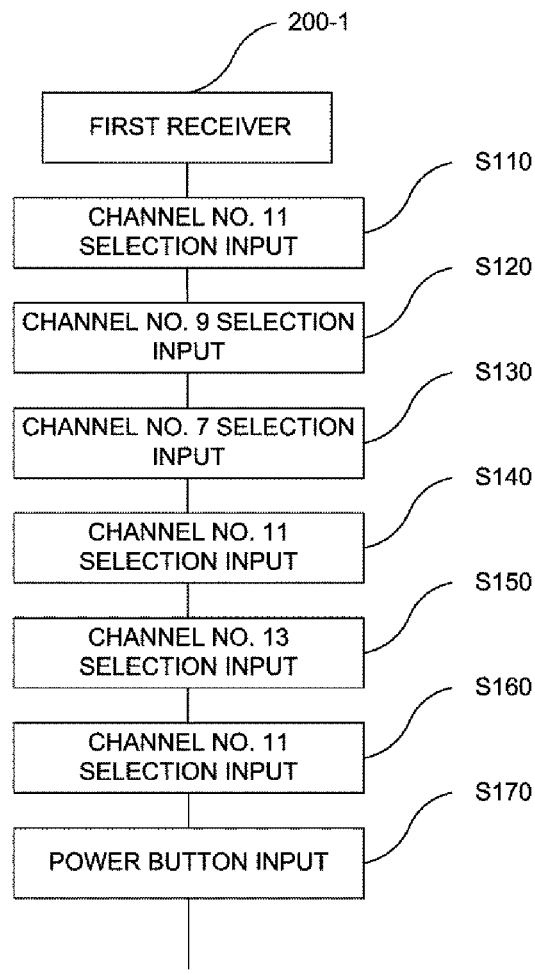

FIG. 7

| ID OF FIRST RECEIVER | |
|---|---|
| 07:15:05 AM | 07:15:24 AM |
| 07:50:23 AM | 07:50:25 AM |
| 08:05:10 AM | 08:05:30 AM |

FIG. 8

| ID OF FIRST RECEIVER | CHANNEL NO.11 |
|---|---|
| 07:15:05 AM | 19 SEC |
| 07:50:23 AM | 2 SEC |
| 08:05:10 AM | 20 SEC |

BOUNCE RATE MEASURING APPARATUS FOR BROADCASTING SERVICE

CROSS-REFERENCE TO RELATED PATENT APPLICATION

This application is a bypass continuation of International Application No. PCT/KR2018/014241, filed on Nov. 20, 2018, in the WIPO, and Korean Patent Application No. 10-2017-0173750, filed on Dec. 18, 2017, in the Korea Intellectual Property Office, the entire contents of which are hereby incorporated by reference.

BACKGROUND

1. Field

The present disclosure relates to a bounce rate measuring apparatus for measuring a bounce rate of a broadcasting service.

2. Description of the Related Art

The development in communication technologies and computing technologies is leading to fast development in broadcasting services. The ratings (viewer ratings) of the broadcasting services are measured to evaluate the efficiency of the broadcasting services. For example, a broadcasting service provider may use the ratings as a reference to evaluate quality such as viewer's satisfaction for the broadcasting services, and an advertiser may use the ratings as a reference to determine the advertisement effects from the broadcasting services.

The ratings are measured by selecting a sample group having uniform distribution in terms of, e.g., geographic location, age, gender, and education level, and collecting viewing behavior information about the broadcasting services provided to the sample group.

Since, however, the conventional rating measurement method measures the ratings of the sample group, the measured ratings are different from the actual ratings. In addition, since a complicated method is used to measure the ratings, even the ratings of the sample group are not accurately measured.

In order to solve such a drawback, Korean Patent No. 10-1751708 (Patent Document 1) entitled "Analysis method and system for audience rating and advertisement effects based on viewing behavior recognition", which was filed on Aug. 17, 2012 and registered on Jun. 22, 2017 by Electronics and Telecommunications Research Institute, discloses therein a method of measuring an audience rating of a sample group with higher accuracy by receiving a viewer image, generating viewer recognition information based on the received image, and generating viewing behavior information based on the viewer recognition information.

However, the method disclosed in Korean Patent No. 10-1751708 also uses a complicated method such as pre-registration of viewers for measuring the audience rating.

Meanwhile, the bounce rate generally represents a percentage of visitors who visit a web site and then leave without receiving information or rather than continuing to view other pages within the website. More specifically, the bounce rate represents a percentage of visitors who visit a website having a start page and a sub-page linked to the start page and then leaves without visiting the sub-page. A high bounce rate typically indicates that visitors only view a website with a low probability of behavior such as product purchase. A low bounce rate indicates that visitors view a website and proceeds to behavior such as product purchase at a high probability. Therefore, the bounce rate can be used as a reference for evaluating especially websites on the internet.

However, the bounce rate is used as a reference that can only be applied to the internet services such as a web page, and such a bounce rate cannot be applied to the broadcasting services. In other words, the broadcasting services provide contents continuously unlike the web page, so that there are no start page and no sub-pages. Therefore, the bounce rate applied to internet services cannot be applied to the broadcasting services.

RELATED ART DOCUMENT

Patent Document

Patent Document 1: Korean Patent No. 10-1751708

SUMMARY

Described herein is a technique capable of providing a bounce rate measuring apparatus for measuring a bounce rate of a broadcasting service using service provision information generated based on a viewer's behavior of selecting a channel and leaving the channel.

According to one aspect of the technique of the present disclosure, there is provided a bounce rate measuring apparatus for a broadcasting service including: a first instruction that, when executed, respectively receives a first service provision information to an n-th service provision information from a first receiver to an n-th receiver each of which receives and provides the broadcasting service while each of the first to n-th service provision information includes at least information on the provision of predetermined one or more channels among a first channel to an m-th channel of the broadcasting service through each of the first to n-th receivers where "n" and "m" are a natural number greater than or equal to 2; a second instruction that, when executed, analyzes the first to n-th service provision information to determine a first number of times based on the number of times that each of the predetermined one or more channels is provided through each of the first to n-th receivers for a time period longer than or equal to a first threshold during a predetermined period and to determine a second number of times based on the number of times that each of the predetermined one or more channels is provided through each of the first to n-th receivers for a time period longer than or equal to the first threshold and shorter than or equal to a second threshold during the predetermined period; and a third instruction that, when executed, extracts bounce rate information of each of the predetermined one or more channels based on the first number of times and the second number of times.

BRIEF DESCRIPTION OF THE DRAWINGS

FIG. 5 shows a process of selecting a channel and leaving the channel in a receiver.

FIGS. 6 to 8 show examples of service provision information generated by the process shown in FIG. 5.

DETAILED DESCRIPTION

Figure 1:
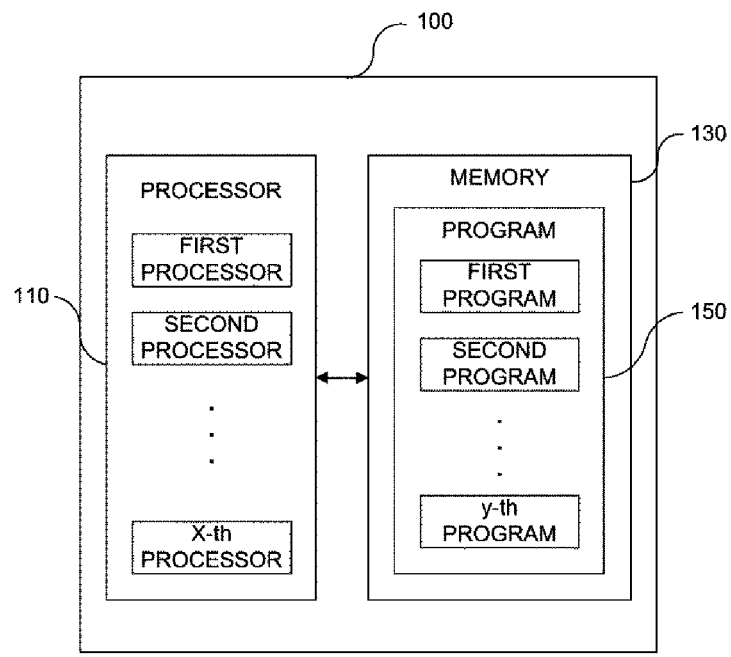
FIG. 1 is a block diagram showing an exemplary configuration of a bounce rate measuring apparatus to one or more embodiments described herein.

Hereinafter, one or more embodiments (also simply referred to as "embodiments") of a bounce rate measuring apparatus for broadcasting services according to the technique of the present disclosure will be described in detail with reference to the accompanying drawings. In the drawings for describing the embodiments of the present disclosure, only a part of the practical configurations may be illustrated, a part of the practical configurations may be omitted or changed, and relative dimensions and proportions of parts therein may be exaggerated or reduced in size for the sake of convenience of description.

First Embodiment

FIG. 1 is a block diagram showing an exemplary configuration of a bounce rate measuring apparatus according to the embodiments described herein.

Referring to FIG. 1, a bounce rate measuring apparatus 100 according to the embodiments described herein includes one or more processors 110, one or more memories 130, and one or more programs 150 that are stored in the one or more memories 130 and executed by the one or more processors 110. The one or more processors 110 may be implemented by a semiconductor device such as a CPU (Central Processing Unit). The one or more memories 130 may be implemented by a semiconductor device such as a flash memory and a HDD (Hard Disk Drive).

The one or more processors 110 read and execute the one or more programs 150 stored in the one or more memories 130. In FIG. 1, the number of processors 110 is x where x is a natural number and, thus, there may be one processor 110 or multiple processors 110. In other words, the function of the bounce rate measuring apparatus 100 can be realized by one processor or a cooperative operation of multiple processors. For example, the function of the bounce rate measuring apparatus 100 can be realized by causing a first processor to execute a calculation function and a second processor to execute a communication function.

The one or more memories 130 store the one or more programs 150. The one or more memories 130 are storage medium such as a non-volatile memory or a volatile memory that is computer-readable storage medium. In FIG. 1, although one memory 130 is illustrated, there may be multiple memories 130.

Further, in FIG. 1, the number of programs 150 is y where y is a natural number and, thus there may be one program 150 or multiple programs 150. In other words, the function of the bounce rate measuring apparatus 100 can be realized by one program or by a cooperative operation of multiple programs. For example, the function of the bounce rate measuring apparatus 100 can be realized by causing a first program to execute a calculation function and a second program to execute a communication function.

Hereinafter, the one or more processors 110, the one or more memories 130, the one or more programs 150 will be referred to as "processor 110," "memory 130," and "program 150," respectively.

Figure 2:
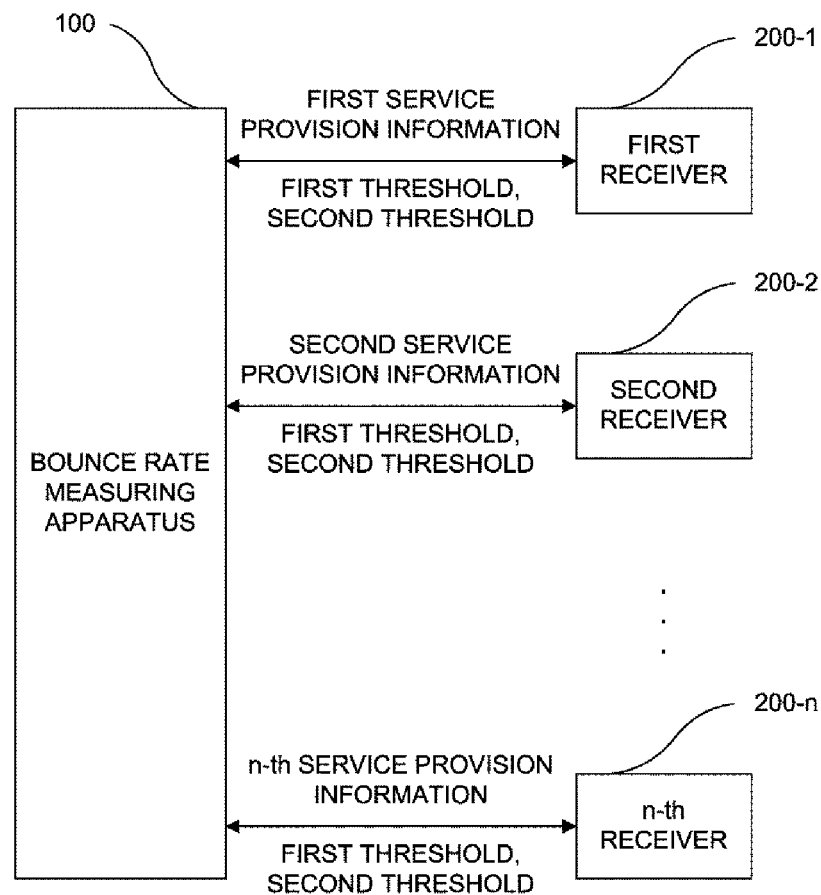
FIG. 2 shows a system environment in which the bounce rate measuring apparatus according to the embodiments described herein operates.
Figure 3:
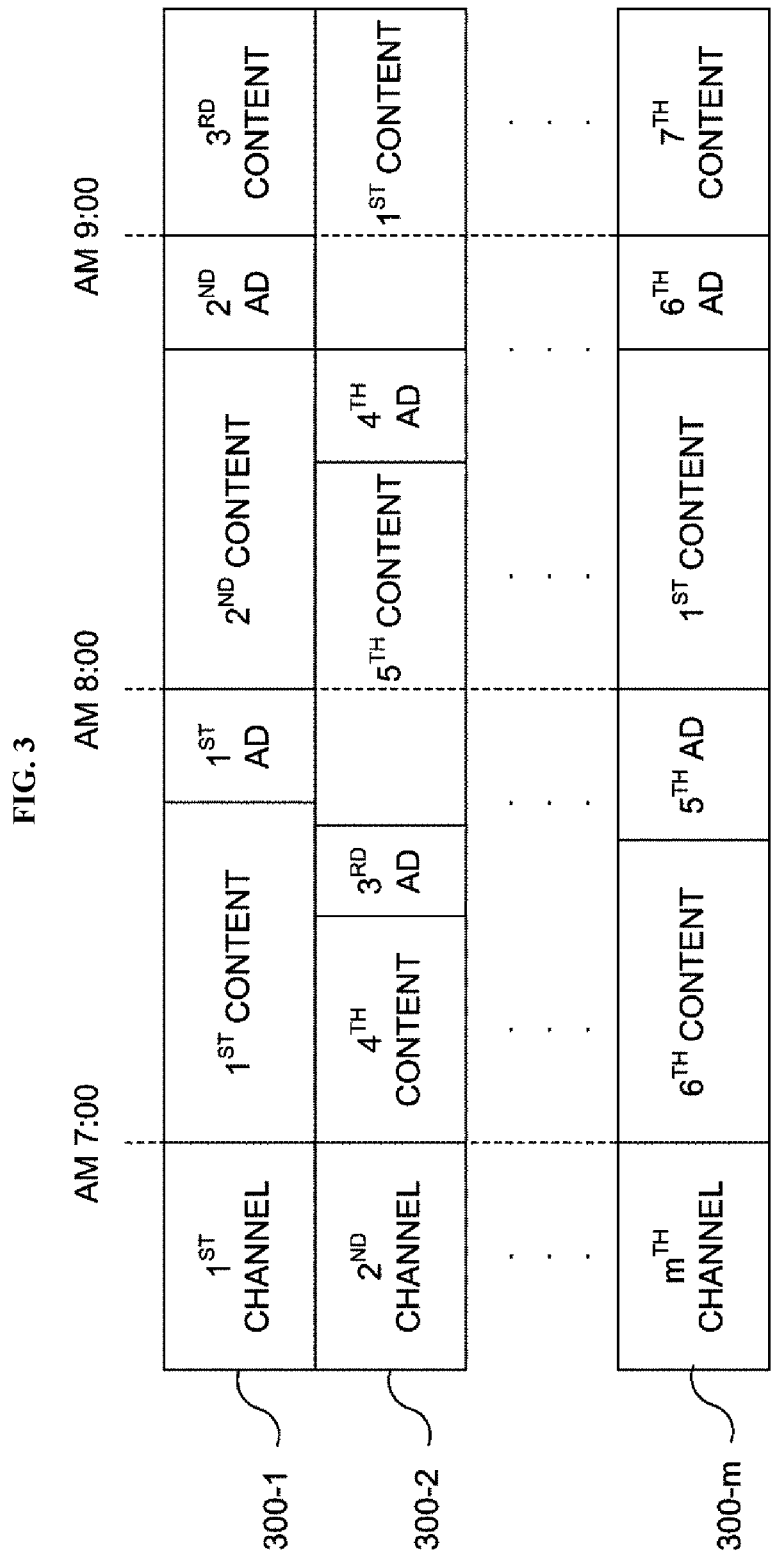
FIG. 3 shows an example of channels and broadcast schedules of the channels of a broadcasting service in the bounce rate measuring apparatus according to the embodiments described herein.

FIG. 2 shows a system environment in which the bounce rate measuring apparatus according to the embodiments described herein operates, and FIG. 3 shows an example of channels and broadcast schedules of the channels of a broadcasting service in the bounce rate measuring apparatus according to the embodiments described herein.

Referring to FIG. 2, the system environment in which the bounce rate measuring apparatus according to the embodiments described herein operates includes the bounce rate measuring apparatus 100 and a first receiver 200-1 to a n-th receiver 200-n where "n" is a natural number greater than or equal to 2.

The bounce rate measuring apparatus 100 is configured to measure a bounce rate of a broadcasting service. The bounce rate measuring apparatus 100 may be, e.g., a part of a broadcasting service system that provides the broadcasting service. However, the bounce rate measuring apparatus 100 may be implemented separately from the broadcasting service system. The bounce rate measuring apparatus 100 may be connected to the first to n-th receivers 200-1 to 200-n through a broadcast network or a communication network to transmit and receive data.

Each of the first to n-th receivers 200-1 to 200-n is configured to receive and provide digital broadcasting and may be, e.g., any one of a set-top box, a television, a personal computer, and a mobile communication terminal. In this specification, "digital broadcasting" refers to broadcasting services such as digital terrestrial broadcasting, digital cable broadcasting, digital satellite broadcasting, digital multimedia broadcasting (DMB), internet protocol television (IP-TV), over the top (OTT), and video on demand (VOD) broadcasting. Preferably, each of the first to n-th receivers 200-1 to 200-n is configured to perform two-way communication such as IP-TV, and transmit and receive data to and from the bounce rate measuring apparatus 100.

"n" may be appropriately determined based on the number of receivers that are specified by the bounce rate measuring apparatus 100 to measure the bounce rate. For example, when the bounce rate measuring apparatus 100 measures the bounce rates of all of the receivers subscribed to the broadcasting service system, "n" may be the total number of receivers subscribed to the broadcasting service system. For example, when the bounce rate measuring apparatus 100 measures the bounce rates of receivers of a particular group among all of the receivers subscribed to the broadcasting service system, "n" may be the number of the receivers of the particular group. The particular group can be determined based on parameters such as a geographic location, a receiver's performance, a rate plan, and a subscriber's age.

Referring to FIG. 3, the broadcast schedules of a first channel to an m-th channel (m being a natural number greater than or equal to 2) are illustrated. The broadcast schedules include contents provided through the channels and broadcasting time at which each of the contents is broadcasted. "m" may be appropriately determined based on the number of channels that are specified by the bounce rate measuring apparatus 100 to measure the bounce rate. For example, when the bounce rate measuring apparatus 100 measures the bounce rates of all of the channels of the broadcasting service, "m" may be the total number of the channels of the broadcasting service. For example, when the bounce rate measuring apparatus 100 measures the bounce rates of channels of a particular group among all of the channels of the broadcasting service, "m" may be the number of the channels of the particular group.

Referring to FIG. 3, the broadcast schedule of the first channel 300-1 sequentially includes, e.g., a first content, a first advertisement, a second content, a second advertisement, and a third content in that order. The broadcast schedule of the second channel 300-2 sequentially includes, e.g., a fourth content, a third advertisement, a fifth content, a fourth advertisement, and the first content in that order. Further, the broadcast schedule of the m-th channel 300-$m$ sequentially includes, e.g., a sixth content, a fifth advertisement, the first content, a sixth advertisement, and a seventh content in that order. As shown in FIG. 3, for example, the broadcast schedules of the first to m-th channels 300-1 to 300-$m$ may all include the first content. When all of the broadcast schedules of the first to m-th channels 300-1 to 300-$m$ include the first content, the bounce rate of the content to be described below can be extracted.

In the specification, "bounce rate" is defined and used to evaluate the quality of the broadcasting services. In the specification, the bounce rate is defined as follows.

a) Bounce Rate of Channel

The bounce rate of a channel is calculated based on information on the provision (broadcasting) of a specific channel among the first to m-th channels 300-1 to 300-$m$, i.e., the provision of an i-th channel (i being a natural number greater than or equal to 1 and smaller than or equal to m) through each of the first to n-th receivers 200-1 to 200-$n$.

$$\text{Bounce rate of an } i\text{-th channel} = \frac{\text{(the number of times that an } i\text{-th channel is provided through each of the first to } n\text{-th receivers 200-1 to 200-}n \text{ for a time period longer than or equal to a first threshold and shorter than or equal to a second threshold during a predetermined period)}}{\text{(the total number of time that the } i\text{-th channel is provided through each of the first to } n\text{-th receivers 200-1 to 200-}n \text{ for a time period longer than or equal to the first threshold during the predetermined period)}} \quad <\text{Equation 1}>$$

In the equation 1, the predetermined period is a period for measuring a bounce rate, e.g., one day, one week, or one month.

The first threshold is determined while considering a delay time from when each of the first to n-th receivers 200-1 to 200-$n$ receives a user input of selecting the i-th channel to when the i-th channel is signal-processed and provided to a viewer. For example, a predetermined period of time may be required from when the first receiver 200-1 receives the user input of selecting the i-th channel, e.g., a channel No. 11, to when the channel No. 11 is signal-processed and provided to the viewer. In addition, the viewer can select a desired channel by pressing a channel-up button instead of directly selecting a channel number. The first threshold is determined while considering such a period of time. For example, the first threshold may be set to three seconds.

The second threshold is dynamically determined based on identification information of the i-th channel. Specifically, the second threshold is dynamically selected from a plurality of thresholds based on the identification information of the i-th channel and can vary depending on the characteristics of the channel or the characteristics of the contents of the channel. For example, when the i-th channel is a news channel, the second threshold is set to 10 seconds; when the i-th channel is a movie channel, the second threshold is set to 20 seconds; and when the i-th channel is a home shopping channel, the second threshold is set to 30 seconds. The second threshold is a period of time required for a viewer who has selected the i-th channel and has checked the contents of the i-th channel to determine whether to keep watching the i-th channel or to switch to another channel. In other words, the second threshold indicates a period of time required for a viewer to determine whether or not to keep watching the i-th channel without channel zapping.

Hereinafter, in the specification, the bounce rate of the i-th channel will be expressed as follows:

BR (identification information of the i-th channel, start point of period, end point of period, first threshold, second threshold).

For example, BR (channel No. 11, 2017-11-1 00:00:00, 2017-11-30 23:59:59, 3 seconds, 10 seconds) indicates a bounce rate of the channel No. 11 that is measured while setting the first threshold to 3 seconds and the second threshold to 10 second during one month from Nov. 1, 2017 at 00:00:00 to Nov. 30, 2017 at 23:59:59.

b) Bounce Rate of Channel Provided Through Specific Receiver

The bounce rate of a channel provided through a specific receiver is calculated based on information on the provision of a specific channel among the first to m-th channels 300-1 to 300-$m$, i.e., the provision of an i-th channel (i being a natural number greater than or equal to 1 and smaller than or equal to m) through a specific receiver, i.e., a j-th receiver (j being a natural number greater than or equal to 1 and smaller than or equal to n) among the first to n-th receivers 200-1 to 200-$n$.

$$\text{Bounce rate of a channel provided through a specific receiver} = \frac{\text{(the number of times that an } i\text{-th channel is provided through a } j\text{-th receiver for a time period longer than or equal to a first threshold and shorter than or equal to a second threshold during a predetermined period)}}{\text{(the total number of times that the } i\text{-th channel is provided through the } j\text{-th receiver for a time period longer than or equal to the first threshold during the predetermined period)}} \quad <\text{Equation 2}>$$

Hereinafter, in the specification, the bounce rate of the i-th channel provided through the j-th receiver will be expressed as follows:

BR (identification information of the i-th channel, identification information of the j-th channel, start point of period, end point of period, first threshold, second threshold).

For example, BR (channel No. 11, identification information of the first receiver, 2017-11-1 00:00:00, 2017-11-30 23:59:59, 3 seconds, 10 seconds) indicates a bounce rate of the channel No. 11 provided through the first receiver 200-1 that is measured while setting the first threshold to 3 seconds and the second threshold to 10 second during one month from Nov. 1, 2017 at 00:00:00 to Nov. 30, 2017 at 23:59:59.

c) Bounce Rate of Content

The bounce rate of a content is calculated based on information on the provision of a specific content through each of the first to n-th receivers 200-1 to 200-$n$.

$$\text{Bounce rate of a content} = \frac{\text{(the number of times that a specific content is provided through each of the first to } n\text{-th receivers 200-1 to 200-}n \text{ for a time period longer than or equal to a first threshold and shorter than or equal to a second threshold during a predetermined period)}}{\text{(the total number of times that the specific content is provided through each of the first to } n\text{-th receivers 200-1 to 200-}n \text{ for a time period longer than or equal to the first threshold during the predetermined period)}} \quad <\text{Equation 3}>$$

Preferably, the bounce rate of the content can calculated from when a viewer selects the specific content, in particular, from when the viewer selects the specific content after the channel switching. In other words, in the specification, the bounce rate is measured when the viewer switches channels and, thus, the bounce rate is not measured, e.g., when the viewer watches the specific content without switching to the specific channel and when advertisement or other contents are being broadcasted at the time of selecting the specific channel. For example, the bounce rate of the content in this case may be defined as in the following Equation 4:

Bounce rate of a content=(the number of times that a specific content is provided through each of the first to $m$-th channels 300-1 to 300-$m$ for a time period longer than or equal to a first threshold and shorter than or equal to a second threshold from the selection of each of the first to $m$-th channels 300-1 to 300-$m$ in each of the first to $n$-th receivers 200-1 to 200-$n$ during a predetermined period)/(the total number of times that the specific content is provided through each of the first to $m$-th channels 300-1 to 300-$m$ for a time period longer than or equal to the first threshold from the selection of each of the first to $m$-th channels 300-1 to 300-$m$ in each of the first to $n$-th receivers 200-1 to 200-$n$ during the predetermined period). <Equation 4>

Hereinafter, in the specification, the bounce rate of content is expressed as follows:

BR (identification information of content, start point of period, end point of period, first threshold, second threshold).

For example, BR (identification information of the first content, 2017-11-01 00:00:00, 2017-11-30 23:59:59, 3 seconds, 10 seconds) indicates a bounce rate of the first content that is measured while setting the first threshold to 3 seconds and the second threshold to 10 seconds during one month from Nov. 1, 2017 at 00:00:00 to Nov. 30, 2017 at 23:59:59.

d) Bounce Rate of Content Provided Through Specific Channel

The bounce rate of a content provided through a specific channel is calculated based on information on the provision of a specific content through a specific channel, i.e., the i-th channel of each of the first to n-th receivers 200-1 to 200-$n$.

Bounce rate of a content provided through a specific channel=(the number of times that a specific content is provided through an $i$-th channel in each of the first to $n$-th receivers 200-1 to 200-$n$ for a time period longer than or equal to a first threshold and shorter than or equal to a second threshold during a predetermined period)/(the total number of times that the specific content is provided through the $i$-th channel in each of the first to $n$-th receivers 200-1 to 200-$n$ for a time period longer than or equal to the first threshold during the predetermined period) <Equation 5>

Meanwhile, it is preferred that the bounce rate of the content provided through the specific channel is calculated from when a viewer switches to a specific channel and selects the specific content of the specific channel. In other words, in the specification, the bounce rate is measured when the viewer switches channels and, thus, the bounce rate is not measured, e.g., when the viewer watches the specific content without switching to the specific channel and when advertisement or other contents are being broadcasted at the time of selecting the specific channel. For example, the bounce rate of the content in this case may be defined as in the following Equation 6:

Bounce rate of a content provided through an $i$-th channel=(the number of times that a specific content is provided through an $i$-th channel for a time period longer than or equal to a first threshold and shorter than or equal to a second threshold from the selection of the $i$-th channel in each of the first to $n$-th receivers 200-1 to 200-$n$ during a predetermined period)/(the total number of times that the specific content is provided through the $i$-th channel for a time period longer than or equal to the first threshold from the selection of the $i$-th channel in each of the first to $n$-th receivers 200-1 to 200-$n$ during the predetermined period) <Equation 6>

Hereinafter, in the specification, the bounce rate of the content provided through the i-th channel will be expressed as follows:

BR (identification information of content, identification information of the i-th channel, start point of period, end point of period, first threshold, second threshold).

For example, BR (identification information of the first content, identification information of the i-th channel, 2017-11-01 00:00:00, 2017-11-30 23:59:59, 3 seconds, 10 seconds) indicates a bounce rate of the first content provided through the i-th channel that is measured while setting the first threshold to 3 seconds and the second threshold to 10 seconds during one month from Nov. 1, 2017 at 00:00:00 to Nov. 30, 2017 at 23:59:59.

e) Bounce Rate of Content Provided Through Specific Receiver

The bounce rate of a content provided through a specific receiver is calculated based on information on the provision of a specific content provided through a specific receiver, i.e., a j-th receiver (j being a natural number greater than or equal to 1 and smaller than or equal to n), among the first to n-th receivers 200-1 to 200-$n$.

Bounce rate of a content provided through a $j$-th receiver=(the number of times that a specific content is provided through a $j$-th receiver for a time period longer than or equal to a first threshold and shorter than or equal to a second threshold during a predetermined period)/(the total number of times that the specific content is provided through the $j$-th receiver for a time period longer than or equal to the first threshold during the predetermined period) <Equation 7>

Meanwhile, it is preferred that the bounce rate of the content provided through the specific channel is calculated from when a viewer switches to a specific channel and selects the specific content of the specific channel. In other words, in the specification, the bounce rate is measured when the viewer switches channels and, thus, the bounce rate is not measured, e.g., when the viewer watches the specific content without switching to the specific channel and when advertisement or other contents are being broadcasted at the time of selecting the specific channel. For example, the bounce rate of the content in this case may be defined as in the following Equation 8:

Bounce rate of a content provided through a $j$-th receiver=(the number of times that a specific content is provided through each of the first to $m$-th channels 300-1 to 300-$m$ for a time period longer than or equal to a first threshold and shorter than or equal to a second threshold from the selection of each of the first to $m$-th channels 300-1 to 300-$m$ in the $j$-th receiver during a predetermined period)/(the total number of times that the specific content is provided through each of the first to $m$-th channels 300-1 to 300-$m$ for a time period longer than or equal to the first threshold from the selection of each of the first to $m$-th channels 300-1 to 300-$m$ in the $j$-th receiver) <Equation 8>

Hereinafter, in the specification, the bounce rate of the content provided through the j-th receiver is expressed as follows:

BR (identification information of content, identification information of the j-th receiver, start point of period, end point of period, first threshold, second threshold).

For example, BR (identification information of the first content, identification information of the first receiver, 2017-11-01 00:00:00, 2017-11-30 23:59:59, 3 seconds, 10 seconds) indicates a bounce rate of the first content provided through the first receiver 200-1 that is measured while setting the first threshold to 3 seconds and the second threshold to 10 seconds during one month from Nov. 1, 2017 at 00:00:00 to Nov. 30, 2017 at 23:59:59.

In the specification, BR (identification information of content, identification information of the j-th receiver, start point of period, end point of period, first threshold, second threshold) may be simply expressed as BR (identification information of content, identification information of the j-th receiver, first threshold, second threshold).

f) Bounce Rate of Content Provided Through Specific Channel in Specific Receiver The bounce rate of a content provided through a specific channel in a specific receiver is calculated based on information on the provision of a specific content provided through a specific channel, i.e., an i-th channel, among the first to m-th channels 300-1 to 300-m in a specific receiver, i.e., a j-th receiver, among the first to n-th receivers 200-1 to 200-n where "i" is a natural number greater than or equal to 1 and smaller than or equal to "m" and "j" is a natural number greater than or equal to 1 and smaller than or equal to "n."

Bounce rate of a content provided through an $i$-th channel in a $j$-th receiver=(the number of times that a specific content is provided through an $i$-th channel in a $j$-th receiver for a time period longer than or equal to a first threshold and shorter than or equal to a second threshold during a predetermined period)/(the total number of times that the specific content is provided through the $i$-th channel in the $j$-th receiver for a time period longer than or equal to the first threshold during the predetermined period)  <Equation 9>

Meanwhile, it is preferred that the bounce rate of the content provided through the specific channel is calculated from when a viewer switches to a specific channel and selects the specific content of the specific channel. In other words, in the specification, the bounce rate is measured when the viewer switches channels and, thus, the bounce rate is not measured, e.g., when the viewer watches the specific content without switching to the specific channel and when advertisement or other contents are being broadcasted at the time of selecting the specific channel. For example, the bounce rate of the content in this case may be defined as in the following Equation 10:

Bounce rate of a content provided through an $i$-th channel in a $j$-th receiver=(the number of times that a specific content is provided through an $i$-th channel for a time period longer than or equal to a first threshold and shorter than or equal to a second threshold from the selection of the $i$-th channel in a $j$-th receiver during a predetermined period)/(the total number of times that the specific content is provided through the $i$-th channel for a time period longer than or equal to the first threshold from the selection of the $i$-th channel in the $j$-th receiver)<Equation 10>

Hereinafter, in the specification, the bounce rate of the content provided through the i-th channel in the j-th receiver is expressed as follows:

BR (identification information of content, identification information of the i-th channel, identification information of the j-th receiver, start point of period, end point of period, first threshold, second threshold).

For example, BR (identification information of the first content, channel No. 11, identification information of the first receiver, 2017-11-01 00:00:00, 2017-11-30 23:59:59, 3 seconds, 10 seconds) indicates a bounce rate of the first content provided through the channel No. 11 in the first receiver 200-1 that is measured while setting the first threshold to 3 seconds and the second threshold to 10 seconds during one month from Nov. 1, 2017 at 00:00:00 to Nov. 30, 2017 at 23:59:59.

In the specification, BR (identification information of content, identification information of the i-th channel, identification information of the j-th receiver, start point of period, end point of period, first threshold, second threshold) may be simply expressed as BR (identification information of content, identification information of the i-th channel, identification information of the j-th receiver, first threshold, second threshold).

Referring back to FIG. 2, the bounce rate measuring apparatus 100 may transmit, e.g., the first threshold and the second threshold, to each of the first to n-th receivers 200-1 to 200-n. In addition, each of the first to n-th receivers 200-1 to 200-n generates a first service provision information or an n-th service provision information based on the first threshold and the second threshold, and then transmits the generated service provision information to the bounce rate measuring apparatus 100. In addition, the bounce rate measuring apparatus 100 may also transmit, e.g., identification information of the i-th channel or identification information of the content to each of the first to n-th receivers 200-1 to 200-n. Each of the first to n-th receivers 200-1 to 200-n may generate the first to n-th service provision information based on the identification information of the i-th channel or the content, the first threshold, and the second threshold, and then transmit the generated service provision information to the bounce rate measuring apparatus 100.

Hereinafter, the configuration of the bounce rate measuring apparatus 100 according to the embodiments described herein will be described in detail.

Figure 4:
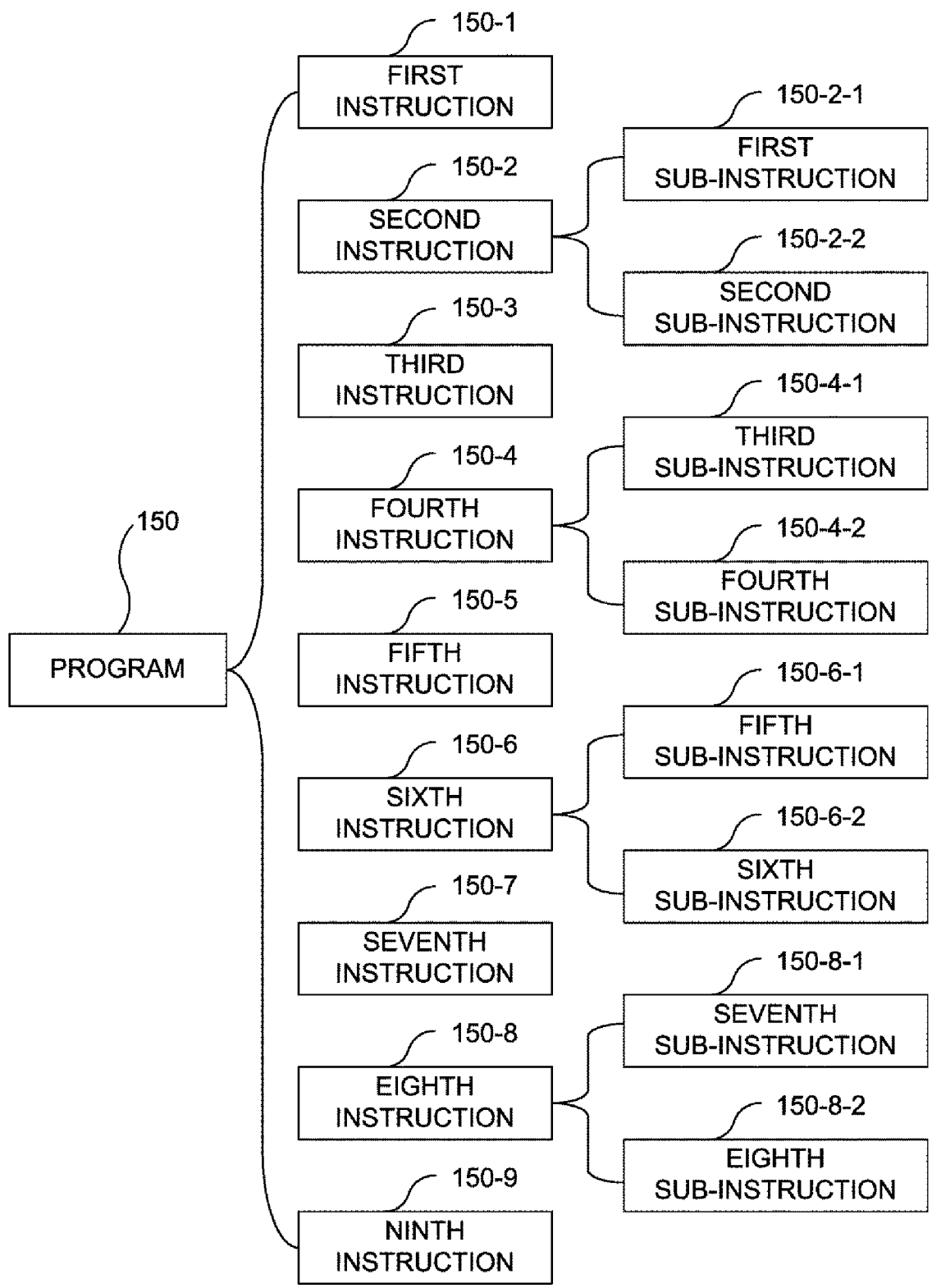
FIG. 4 is a block diagram showing an example of a program that is stored in and executed by the bounce rate measuring apparatus according to the embodiments described herein.

FIG. 4 is a block diagram showing a program that is stored in and executed by the bounce rate measuring apparatus according to the embodiments described herein.

Referring to FIG. 4, the program 150 includes a first instruction 150-1 to a third instruction 150-3. The program 150 may further include at least one of a fourth instruction 150-4 to a ninth instruction 150-9. The second instruction 150-2 may include a first sub-instruction 150-2-1 and a second sub-instruction 150-2-2. The fourth instruction 150-4 may include a third sub-instruction 150-4-1 and a fourth sub-instruction 150-4-2. The sixth instruction 150-6 may include a fifth sub-instruction 150-6-1 and a sixth sub-instruction 150-6-2. The eight instruction 150-8 may include a seventh sub-instruction 150-8-1 and an eighth sub-instruction 150-8-2.

The first instruction 150-1, when executed, respectively receives a first service provision information to an n-th service provision information from the first to n-th receivers 200-1 to 200-n each of which receives and provides the broadcasting service. Each of the first to n-th service provision information includes at least information on the provision of predetermined one or more channels among the first to m-th channels 300-1 to 300-m of the broadcasting service through the corresponding one of the first to n-th receivers 200-1 to 200-n.

The one or more channels may be one predetermined channel, e.g., the i-th channel among the first to m-th channels where "i" is a natural number greater than or equal to 1 and smaller than or equal to "m." Alternatively, the one or more channels may be, e.g., two or more predetermined channels among the first to m-th channels.

Hereinafter, the case where the i-th channel is determined as the predetermined channel will be described.

For example, the first instruction 150-1 receives the first service provision information from the first receiver 200-1 and receives the n-th service provision information from the n-th receiver 200-n.

Hereinafter, each of the first to n-th service provision information will be described in detail with reference to FIGS. 5 to 8.

A process of generating the first service provision information, in the case of determining a channel No. 11 as the i-th channel in the first receiver 200-1, based on at least a user input of selecting the channel No. 11 and a user input of leaving the channel No. 11 will be described with reference to FIGS. 5 to 8. Other service provision information, e.g., the n-th service provision information, may also be generated in the n-th receiver 200-n in the same manner as the generation of the first service provision information. Thus, a description of a process of generating other service provision information is omitted.

FIG. 5 shows a process of selecting a channel and leaving the channel in the receiver.

Referring to FIG. 5, the receiver 200-1 receives, e.g., a user input of selecting the channel No. 11 through a remote controller at 07:15:05 AM (S110). Then, the receiver 200-1 receives, e.g., a user input of selecting a channel No. 9 through the remote controller at 07:15:24 AM (S120). Next, the receiver 200-1 receives, e.g., a user input of selecting a channel No. 7 through the remote controller at 07:25:17 AM (S130). Thereafter, the receiver 200-1 receives, e.g., a user input of selecting the channel No. 11 again through the remote controller at 07:50:23 AM (S140). Then, the receiver 200-1 receives, e.g., a user input of selecting a channel No. 13 through the remote controller at 07:50:25 AM (S150). Next, the receiver 200-1 receives, e.g., a user input of selecting the channel No. 11 again through the remote controller at 08:05:10 AM (S160). Thereafter, the receiver 200-1 receives, e.g., a user input of turning off the power through the remote controller at 08:05:30 AM (S170).

FIGS. 6 to 8 show examples of the service provision information generated by the process shown in FIG. 5.

Referring to FIG. 6, the first service provision information is illustrated.

The first service provision information may include identification information of the first receiver 200-1 ("first receiver's ID), identification information of a channel and a time at which an event has occurred through the remote controller. As shown in FIG. 6, for example, the first service provision information may include "channel No. 11, 07:15:05 AM," "channel No. 9, 07:15:24 AM," "channel No. 7, 07:25:17 AM," "channel No. 11, 07:50:23 AM," "channel No. 13, 07:50:25 AM," "channel No. 11, 08:05:10 AM," and "turn-off, 08:05:30 AM."

Referring to FIG. 6, the first receiver 200-1 generates the first service provision information based on all of the user inputs in association with the switching of the channels or the leaving of the channels and transmits the first service provision information to the bounce rate measuring apparatus 100 according to the embodiments described herein. However, when the first service provision information is generated based on all of the user inputs in association with the switching of the channels or the leaving of the channels, the data size of the first service provision information becomes large. Therefore, when such a first service provision information is transmitted to the bounce rate measuring apparatus 100, a communication load and a computational load in the first receiver 200-1 may occur. In addition, the bounce rate measuring apparatus 100 also has a disadvantage in that it is necessary to perform a computational work based on all of the user inputs in association with the switching or the leaving of the channels.

Therefore, the first service provision information may be simplified to include identification information of the first receiver 200-1, identification information of the i-th channel, time at which the first receiver 200-1 receives a user input of selecting the i-th channel, and time at which the first receiver 200-1 receives a user input of leaving the i-th channel.

Referring to FIG. 7, when the channel No. 11 is determined as the i-th channel, the first receiver 200-1 generates the first service provision information based on a user input of selecting the channel No. 11 and a user input of leaving the channel No. 11. The user input of leaving the channel No. 11 includes a power button input, i.e., turn-off, shown in step S170.

Referring to FIG. 7, the first service provision information may include identification information of the first receiver 200-1 ("first receiver's ID), identification information of the i-th channel ("channel No. 11"), time at which the first receiver 200-1 receives the user input of selecting the channel No. 11, and time at which the first receiver 200-1 receives the user input of leaving the channel No. 11. For example, referring to FIG. 7, the time at which the first receiver 200-1 receives the user input of selecting the channel No. 11 and the time at which the first receiver 200-1 receives the user input of leaving the channel No. 11 are "07:15:05 AM, 07:15:24 AM," "07:50:23 AM, 07:50:25 AM," and "08:05:10 AM, 08:05:30 AM."

Further, referring to FIG. 8, the first service provision information may include identification information of the first receiver 200-1 ("first receiver's ID), identification information of the i-th channel ("channel No. 11"), time at which the first receiver 200-1 receives the user input of selecting the channel No. 11, and a time difference between the time at which the first receiver 200-1 receives the user input of selecting the channel No. 11 and the time at which the first receiver 200-1 receives the user input of leaving the channel No. 11. For example, referring to the time at which the first receiver 200-1 receives the user input of selecting the channel No. 11 and the time difference shown in FIG. 8, the first service provision information includes "07:15:05 AM, 19 seconds," "07:50:23 AM, 2 seconds," and "08:05:10 AM, 20 seconds." The time difference indicates the time period during which the channel No. 11 is provided (broadcasted) by the first receiver 200-1. In other words, the time difference indicates the time period of continuing to view the channel No. 11.

Alternatively, the first receiver 200-1 may generate the first service provision information based on the first threshold and the second threshold.

For example, when the first threshold is set to 3 seconds, the first receiver 200-1 provides the first service provision information only when the i-th channel, e.g., the channel No. 11, is provided for at least 3 seconds through the first receiver 200-1.

For example, in the first service provision information illustrated in FIG. 8, "07:50:23 AM, 2 seconds", among the times at each of which the first receiver 200-1 receives the first user input and the time durations of continuing to view the channel, is a case where the i-th channel, i.e., the channel No. 11, is provided through the first receiver 200-1 for a time period less than the first threshold. Therefore, when using the first threshold to generate the first service provision information, "07:50:23 AM, 2 seconds" may be excluded from the first service provision information.

Referring back to FIG. 4, the second instruction 150-2, when executed, analyzes the first to n-th service provision information received through the first instruction 150-1 to determine a first number of times based on the number of times that each of the one or more channels is provided through each of the first to n-th receivers 200-1 to 200-n for a time period longer than or equal to the first threshold during the predetermined period and to determine a second number of times based on the number of times that each of the one or more channels is provided through each of the first to n-th receivers 200-1 to 200-n for a time period longer than or equal to the first threshold and shorter than or equal to the second threshold during the predetermined period.

The first number of times and the second number of times are values used by the third instruction 150-3 to be described later to extract the bounce rate information of each of the one or more channels.

The first number of times may be directly set to, e.g., the number of times that each of the one or more channels is provided through each of the first to n-th receivers 200-1 to 200-n for the time period longer than or equal to the first threshold during the predetermined period. Further, the second number of times may be directly set to, e.g., the number of times that each of the one or more channels is provided through each of the first to n-th receivers 200-1 to 200-n for the time period longer than or equal to the first threshold and shorter than or equal to the second threshold during the predetermined period.

In the case of determining the first number of times and the second number of times to extract the bounce rate information of each of the one or more channels, e.g., the i-th channel, it is preferable to exclude the case where advertisement information is provided through the i-th channel. In other words, when the advertisement information is provided, viewers often switch to other channels without continuing to watch the channel.

The second instruction 150-2 may include the first sub-instruction 150-2-1 and the second sub-instruction 150-2-2.

The first sub-instruction 150-2-1, when executed, determines the first number of times by subtracting, from the number of times that each of the one or more channels is provided through each of the first to n-th receivers 200-1 to 200-n for the time period longer than or equal to the first threshold during the predetermined period, the number of times that each of the one or more channels is provided through each of the first to n-th receivers 200-1 to 200-n for the time period longer than or equal to the first threshold within a time period in which the advertisement information is scheduled to each of the one or more channels, which is determined by comparing each of the first to n-th service provision information and the scheduling information of each of the one or more channels, during the predetermined period.

As shown in FIG. 6, for example, when the advertisement information is provided through the i-th channel, e.g., the channel No. 11 for 2 seconds from 07:50:23 AM, the case where the channel No. 11 is provided for 2 seconds from 07:50:23 AM is not included in the calculation of the first number of times. Further, for example, when the one or more channels include other channels in addition to the i-th channel, the case where the advertisement information is provided through each of the other channels is not included in the calculation of the first number of times for the corresponding channel.

The second sub-instruction 150-2-2, when executed, determines the second number of times by subtracting, from the number of times that each of the one or more channels is provided through each of the first to n-th receivers 200-1 to 200-n for the time period longer than or equal to the first threshold and shorter than or equal to the second threshold during the predetermined period, the number of times that each of the one or more channels is provided through each of the first to n-th receivers 200-1 to 200-n for the time period longer than or equal to the first threshold and shorter than or equal to the second threshold within a time period in which the advertisement information is scheduled to each of the one or more channels during the predetermined period.

The bounce rate information for each of the one or more channels, e.g., the bounce rate information of the i-th channel, can be more accurately extracted by the first sub-instruction 150-2-1 and the second sub-instruction 150-2-2.

Referring back to FIG. 4, the third instruction 150-3, when executed, extracts the bounce rate information of each of the one or more channels based on the first number of times and the second number of times determined by the second instruction 150-2. For example, if the i-th channel is determined as the predetermined channel of the one or more channels, the third instruction 150-3 extracts the bounce rate information of the i-th channel.

The bounce rate information of each of the one or more channels includes a ratio of the second number of times to the first number of times. The bounce rate information of each of the one or more channels may further include at least one of the first number of times, the information on the predetermined period, and the identification information of the corresponding one of the one or more channels.

Specifically, the bounce rate information of each of the one or more channels includes the first number of times to extract the frequency of visits to each of the one or more channels based on the number of times in which the viewer has selected each of the one or more channels.

The bounce rate information of each of the one or more channels includes the information on the predetermined period and the identification information of the corresponding one of the one or more channels in order to identify an extraction period of the bounce rate information of the corresponding one of the one or more channels and a target channel in the case of transmitting the bounce rate information of the corresponding one of the one or more channels from the bounce rate measuring apparatus 100 to other external devices.

For example, BR (identification information of channel, start point of period, end point of period, first threshold, second threshold) can be extracted by the first instruction 150-1 to the third instruction 150-3.

Further, by changing the first threshold, the second threshold, the start point of the period, the end point of the period, and the identification information of the channel, it is possible to extract the bounce rate information of a desired channel using desired thresholds and a desired period.

The bounce rate of the i-th channel can be used as, e.g., an index for evaluating the viewer loyalty to the i-th channel. In other words, if the bounce rate is low in spite of a low rating of the i-th channel, it is determined that the viewer loyalty to the i-th channel is high. On the other hand, if the bounce rate is high in spite of a high rating of the i-th channel, it is determined that the viewer loyalty to the i-th channel is low.

Second Embodiment

The first embodiment has been described based on the extraction of the bounce rate information of the i-th channel. In other words, it has been described based on an example of extracting the bounce rate information of the i-th channel for the entirety of the first to n-th receivers 200-1 to 200-n.

However, it is also possible to extract the bounce rate information of the i-th channel only for each receiver.

Referring back to FIG. 4, the program 150 may further include the fourth instruction 150-4 and the fifth instruction 150-5.

The fourth instruction 150-4, when executed, analyzes a j-th service provision information (j being a natural number greater than or equal to 1 and smaller than or equal to n) among the first to n-th service provision information to determine a third number of times based on the number of times that each of the one or more channels is provided through a j-th receiver among the first to n-th receivers 200-1 to 200-n for a time period longer than or equal to the first threshold during a predetermined period and to determine a fourth number of times based on the number of times that each of the one or more channels is provided through each of the first to n-th receivers 200-1 to 200-n for a time period longer than or equal to the first threshold and shorter than or equal to the second threshold during the predetermined period.

The one or more channels may be one predetermined channel, e.g., the i-th channel among the first to m-th channels where "i" is a natural number greater than or equal to 1 and smaller than or equal to "m." Alternatively, the one or more channels may be, e.g., two or more predetermined channels among the first to m-th channels.

The third number of times and the fourth number of times are values used by the fifth instruction 150-5 to be described later to extract the bounce rate information of each of the one or more channels.

The third number of times may be directly set to, e.g., the number of times that each of the one or more channels is provided through the j-th receiver among the first to n-th receivers 200-1 to 200-n for the time period longer than or equal to the first threshold during the predetermined period. Further, the fourth number of times may be directly set to, e.g., the number of times that each of the one or more channels is provided through each of the first to n-th receivers 200-1 to 200-n for the time period longer than or equal to the first threshold and shorter than or equal to the second threshold during the predetermined period.

However, as described in the first embodiment, in the case of determining the third number of times and the fourth number of times to extract the bounce rate information of each of the one or more channels through the j-th receiver, it is preferable to exclude the case where advertisement information is provided through the i-th channel in the j-th receiver. In other words, when the advertisement information is provided, viewers often switch to other channels without continuing to watch the channel.

The fourth instruction 150-4 may include the third sub-instruction 150-4-1 and the fourth sub-instruction 150-4-2.

The third sub-instruction 150-4-1, when executed, determines the third number of times by subtracting, from the number of times that each of the one or more channels is provided through the j-th receiver for the time period longer than or equal to the first threshold during the predetermined period, the number of times that each of the one or more channels is provided through the j-th receiver for the time period longer than or equal to the first threshold within a time period in which the advertisement information is scheduled to each of the one or more channels, which is determined by comparing the j-th service provision information and the scheduling information of each of the one or more channels, during the predetermined period.

The fourth sub-instruction 150-4-2, when executed, determines the fourth number of times by subtracting, from the number of times that each of the one or more channels is provided through the j-th receiver for the time period longer than or equal to the first threshold and shorter than or equal to the second threshold during the predetermined period, the number of times that each of the one or more channels is provided through the j-th receiver for the time period longer than or equal to the first threshold and shorter than or equal to the second threshold within a time period in which the advertisement information is scheduled to each of the one or more channels during the predetermined period.

The descriptions of the third sub-instruction 150-4-1 and the fourth sub-instruction 150-4-2 will be omitted since the descriptions thereof are substantially the same as the descriptions of the first sub-instruction 150-2-1 and the second sub-instruction 150-2-2.

The bounce rate information for each of the one or more channels of the j-th receiver, e.g., the bounce rate information of the i-th channel of the j-th receiver, can be more accurately extracted through the third sub-instruction 150-4-1 and the fourth sub-instruction 150-4-2.

Referring back to FIG. 4, the fifth instruction 150-5, when executed, extracts the bounce rate information of each of the one or more channels of the j-th receiver based on the third number of times and the fourth number of times determined by the fourth instruction 150-4. For example, if the i-th channel is determined as the predetermined channel of the one or more channels, the fifth instruction 150-5 extracts the bounce rate information of the i-th channel of the j-th receiver.

The bounce rate information of each of the one or more channels of the j-th receiver includes a ratio of the fourth number of times to the second number of times. The bounce rate information of each of the one or more channels of the j-th receiver may further include at least one of the third number of times, the information on the predetermined period, the identification information of the j-th receiver, and the identification information of the corresponding one of the one or more channels.

For example, BR (identification information of channel, identification information of receiver, start point of period, end point of period, first threshold, second threshold) can be extracted by the first instruction 150-1, the fourth instruction 150-4 and the fifth instruction 150-5.

Further, by changing the first threshold, the second threshold, the identification information of the channel, the identification information of the receiver, the start point of the period, and the end point of the period, it is possible to extract the bounce rate information of a desired channel of a desired receiver using desired thresholds and a desired period.

The bounce rate of the i-th channel of the j-th receiver can be used as, e.g., an index for evaluating the viewer loyalty to the i-th channel of the j-th receiver. In other words, if the bounce rate of the i-th channel of the j-th receiver is low in spite of a low rating of the i-th channel, it is determined that the viewer loyalty to the i-th channel for the j-th receiver is high. On the other hand, if the bounce rate of the i-th channel of the j-th receiver is high in spite of a high rating of the i-th channel, it is determined that the viewer loyalty to the i-th channel for the j-th receiver is low.

Third Embodiment

The first embodiment has been described based on the extraction of the bounce rate information of the i-th channel. In other words, it has been described based on an example of extracting the bounce rate information of the i-th channel for the entirety of the first to n-th receivers 200-1 to 200-n.

However, it is also possible to extract the bounce rate information of a specific content provided through each of the one or more channels in each of the first to n-th receivers 200-1 to 200-n.

Referring back to FIG. 4, the program 150 may further include the sixth instruction 150-6 and the seventh instruction 150-7.

The sixth instruction 150-6, when executed, analyzes the broadcast schedules of the one or more channels and the first to n-th service provision information to determine a fifth number of times based on the number of times that a predetermined content is provided through each of the one or more channels in each of the first to n-th receivers 200-1 to 200-n for a time period longer than or equal to the first threshold during a predetermined period and to determine a sixth number of times based on the number of times that the predetermined content is provided through each of the one or more channels in each of the first to n-th receivers 200-1 to 200-n for a time period longer than or equal to the first threshold and shorter than or equal to the second threshold during the predetermined period.

The one or more channels may be one predetermined channel, e.g., the i-th channel among the first to m-th channels where "i" is a natural number greater than or equal to 1 and smaller than or equal to "m." Alternatively, the one or more channels may be, e.g., two or more predetermined channels among the first to m-th channels.

The seventh instruction 150-7, when executed, extracts the bounce rate information of the predetermined content of each of the one or more channels based on the fifth number of times and the sixth number of times extracted by the sixth instruction 150-6. For example, if the i-th channel is determined as the predetermined channel of the one or more channels, the seventh instruction 150-7 extracts the bounce rate information of the predetermined content of the i-th channel.

The bounce rate information of the predetermined content of each of the one or more channels includes a ratio of the sixth number of times to the fifth number of times. The bounce rate information of the predetermined content of each of the one or more channels may further include at least one of the fifth number of times, the information on the predetermined period, the identification information of the predetermined content, and the identification information of each of the one or more channels.

Meanwhile, it is preferred that the bounce rate of the specific content of each of the one or more channels is calculated from when a viewer switches to a specific channel and selects the specific content of the specific channel. In other words, in the specification, the bounce rate is measured when the viewer switches channels and, thus, the bounce rate is not measured, e.g., when the viewer watches the specific content without switching to the specific channel and when advertisement or other contents are being broadcasted at the time of selecting the specific channel.

The sixth instruction 150-6 may include the fifth sub-instruction 150-6-1 and the sixth sub-instruction 150-6-2.

The fifth sub-instruction 150-6-1, when executed, determines the fifth number of times based on the number of times that a predetermined content is provided through each of the one or more channels for a time period longer than or equal to the first threshold from the selection of each of the one or more channels in each of the first to n-th receivers 200-1 to 200-n during a predetermined period.

The sixth sub-instruction 150-6-2, when executed, determines the sixth number of times based on the number of times that the predetermined content is provided through each of the one or more channels for a time period longer than or equal to the first threshold and shorter than or equal to the second threshold from the selection of each of the one or more channels in each of the first to n-th receivers 200-1 to 200-n during the predetermined period.

Accordingly, it is possible to more accurately obtain the bounce rate information of the specific content of each of the one or more channels.

For example, BR (identification information of content, start point of period, end point of period, first threshold, second threshold) can be extracted by the first instruction 150-1, the sixth instruction 150-6, and the seventh instruction 150-7. In other words, when the one or more channels include all of the channels of the first to m-th channels 300-1 to 300-m as the predetermined channels, BR (identification information of content, start point of period, end point of period, first threshold, second threshold) can be extracted by the first instruction 150-1, the sixth instruction 150-6, and the seventh instruction 150-7.

For example, BR (identification information of content, identification information of channel, start point of period, end point of period, first threshold, second threshold) can be extracted by the first instruction 150-1, the sixth instruction 150-6, and the seventh instruction 150-7. In other words, when the i-th channel is determined as the predetermined channel among the one or more channels, for example, BR (identification information of the content, identification information of the i-th channel, start point of period, end point of period, first threshold, second threshold) can be extracted by the first instruction 150-1, the sixth instruction 150-6, and the seventh instruction 150-7.

By changing the first threshold, the second threshold, the identification information of the content, the identification information of the channel, the start point of the period, and the end point of the period, it is possible to extract the bounce rate information of a desired content of a desired channel using desired thresholds and a desired period.

The bounce rate of the content of the i-th channel can be used, e.g., as an index for evaluating the loyalty of a viewer of the i-th channel to the content of the i-th channel. In other words, if the bounce rate of the content through the i-th channel is low in spite of a low rating of the i-th channel, it is determined that the loyalty of the viewer of the i-th channel to the content of the i-th channel is high. On the contrary, if the bounce rate of the content through the i-th channel is high in spite of a high rating of the i-th channel, it is determined that the loyalty of the viewer of the i-th channel to the content of the i-th channel is low.

Fourth Embodiment

The third embodiment has been described based on the extraction of the bounce rate information of the specific content of each of the one or more channels. In other words, it has been described based on an example in which the specific content is provided through each of the one or more channels in each of the first to n-th receivers 200-1 to 200-$n$.

However, it is also possible to extract the bounce rate information of the specific content is provided through each of the one or more channels in a specific receiver, e.g., a j-th receiver, among the first to n-th receivers 200-1 to 200-$n$.

Referring back to FIG. 4, the program 150 may further include the eighth instruction 150-8 and the ninth instruction 150-9.

The eighth instruction 150-8, when executed, analyzes a j-th service provision information among the first to n-th service provision information to determine a seventh number of times based on the number of times that a predetermined content is provided through each of the one or more channels in a j-th receiver among the first to n-th receivers 200-1 to 200-$n$ for a time period longer than or equal to the first threshold during a predetermined period and to determine an eighth number of times based on the number of times that the predetermined content is provided through each of the one or more channels in the j-th receiver for a time period longer than or equal to the first threshold and shorter than or equal to the second threshold during the predetermined period.

The ninth instruction 150-9, when executed, extracts the bounce rate information of the predetermined content provided through each of the one or more channels and the j-th receiver based on the seventh number of times and the eighth number of times determined by the eighth instruction 150-8. For example, if the i-th channel is determined as the predetermined channel of the one or more channels, the ninth instruction 150-9 extracts the bounce rate information of the predetermined content provided through the i-th channel and the j-th receiver.

The bounce rate information of the predetermined content provided through each of the one or more channels and the j-th receiver includes a ratio of the eighth number of times to the seventh number of times. The bounce rate information of the predetermined content provided through each of the one or more channels and the j-th receiver may further include at least one of the seventh number of times, the information on the predetermined period, the identification information of the predetermined content, the identification information of the j-th receiver, and the identification information of each of the one or more channels.

Meanwhile, it is preferred that the bounce rate of the predetermined content provided through each of the one or more channels and the j-th receiver is calculated from when a viewer switches to each of the one or more channels in the j-th receiver. In other words, in the specification, the bounce rate is measured when the viewer switches channels and, thus, the bounce rate is not measured, e.g., when the viewer watches the specific content without switching to the specific channel and when advertisement or other contents are being broadcasted at the time of selecting the specific channel.

The eighth instruction 150-8 may include the seventh sub-instruction 150-8-1 and the eighth sub-instruction 150-8-2.

The seventh sub-instruction 150-8-1, when executed, determines the seventh number of times based on the number of times that a predetermined content is provided through each of the one or more channels for a time period longer than or equal to the first threshold from the selection of each of the one or more channels in the j-th receiver among the first to n-th receivers 200-1 to 200-$n$ during a predetermined period.

The eighth sub-instruction 150-8-2, when executed, determines the eighth number of times based on the number of times that the predetermined content is provided through each of the one or more channels for a time period longer than or equal to the first threshold and shorter than or equal to the second threshold from the selection of each of the one or more channels in the j-th receiver during the predetermined period.

Accordingly, it is possible to more accurately obtain the bounce rate information of the specific content of each of the one or more channels and the j-th receiver.

For example, BR (identification information of content, identification information of the j-th receiver, start point of period, end point of period, first threshold, second threshold) can be extracted by the first instruction 150-1, the eighth instruction 150-8, and the ninth instruction 150-9. In other words, when the one or more channels include all of the channels of the first to m-th channels 300-1 to 300-$m$ as the predetermined channels, BR (identification information of content, identification information of the j-th receiver, start point of period, end point of period, first threshold, second threshold) can be extracted by the first instruction 150-1, the eighth instruction 150-8, and the ninth instruction 150-9.

For example, BR (identification information of content, identification information of the i-th channel, identification information of the j-th receiver, start point of period, end point of period, first threshold, second threshold) can be extracted by the first instruction 150-1, the eighth instruction 150-8, and the ninth instruction 150-9. In other words, when the i-th channel is determined as the predetermined channel among the one or more channels, for example, BR (identification information of the content, identification information of the i-th channel, identification information of the j-th receiver, start point of period, end point of period, first threshold, second threshold) can be extracted by the first instruction 150-1, the eighth instruction 150-8, and the ninth instruction 150-9.

By changing the first threshold, the second threshold, the identification information of the content, the identification information of the channel, the identification information of the receiver, the start point of the period, and the end point of the period, it is possible to extract the bounce rate information of a desired content of a desired channel and a desired receiver using desired thresholds and a desired period.

The bounce rate of the content of the i-th channel and the j-th receiver can be used, e.g., as an index for evaluating the loyalty of a viewer of the i-th channel in the j-th receiver to the content of the i-th channel in the j-th receiver. In other words, if the bounce rate of the content through the i-th channel in the j-th receiver is low in spite of a low rating of the i-th channel, it is determined that the loyalty of the viewer of the i-th channel in the j-th receiver to the content of the i-th channel in the j-th receiver is high. On the contrary, if the bounce rate of the content through the i-th channel in the j-th receiver is high in spite of a high rating of the i-th channel, it is determined that the loyalty of the viewer of the i-th channel in the j-th receiver to the content of the i-th channel in the j-th receiver is low.

As described above, in accordance with the embodiments, there is provided the bounce rate measuring apparatus for measuring the bounce rate of the broadcasting service using the service provision information generated based on a viewer's behavior of selecting a channel and leaving the channel. For example, the bounce rate related to a specific channel of the broadcasting service may be measured, the bounce rate related to a specific receiver may be measured, or the bounce rate related to a specific content provided through the broadcasting service may be measured. In addition, it is possible to more efficiently evaluate the quality of the broadcasting service or understand a viewer's interest based on the measured bounce rates of the broadcasting service.

According to the embodiments described herein, it is possible to extract information such as viewer's reaction, which cannot be evaluated by a present viewer rating of the broadcasting service, based on the measured bounce rate. Further, according to the embodiments described herein, the degree of the viewer's interest for a specific channel, a specific content, or a specific receiver can be extracted based on the measured bounce rates. In other words, the low bounce rate indicates the high degree of interest and the high bounce rate indicates the low degree of interest. Therefore, according to the embodiments described herein, the measured bounce rate can be used alone or in combination with the present viewer rating in order to evaluate the quality of the broadcasting services or to find out the viewer's interest.

While various examples according to the technique have been described in detail, the above descriptions merely illustrates the idea of the technique described herein, and it will be understood by those skilled in the art to which the technique described herein belongs that various changes and modifications may be made without departing from the scope of the essential characteristics of the technique described herein.

Accordingly, the exemplary embodiments disclosed herein are not used to limit the idea of the technique described herein, but to explain the technique described herein, and the scope of the technical idea of the technique described herein is not limited by those embodiments. Therefore, the scope of protection of the technique described herein should be construed as defined in the following claims, and all technical ideas that fall within the idea of the technique described herein are intended to be embraced by the scope of the claims described below.

In accordance with the technique described herein, there is provided the bounce rate measuring apparatus for measuring the bounce rate of the broadcasting service using the service provision information generated based on a viewer's behavior of selecting a channel and leaving the channel. For example, the bounce rate related to a specific channel of the broadcasting service may be measured, the bounce rate related to a specific receiver may be measured, or the bounce rate related to a specific content provided through the broadcasting service may be measured. In addition, it is possible to more efficiently evaluate the quality of the broadcasting service or understand a viewer's interest based on the measured bounce rates of the broadcasting service.

According to the technique described herein, it is possible to extract information such as viewer's reaction, which cannot be evaluated by a present viewer rating of the broadcasting service, based on the measured bounce rate. Further, according to the technique described herein, the degree of the viewer's interest for a specific channel, a specific content, or a specific receiver can be extracted based on the measured bounce rates. In other words, the low bounce rate indicates the high degree of interest and the high bounce rate indicates the low degree of interest. Therefore, according to the technique described herein, the measured bounce rate can be used alone or in combination with the present viewer rating in order to evaluate the quality of the broadcasting services or to find out the viewer's interest.

[Supplementary Notes]

Embodiments of the technique described herein will be supplementarily described below.

<Supplementary Note 1>

According to one aspect of the present disclosure, there is provided a method of measuring a bounce rate for a broadcasting service by using a bounce rate measuring apparatus including: one or more memories storing the program therein; and one or more processors configured to execute the program, the method including:

(a) respectively receiving a first service provision information to an n-th service provision information from a first receiver to an n-th receiver each of which receives and provides the broadcasting service wherein each of the first to n-th service provision information includes at least information on the provision of predetermined one or more channels among a first channel to an m-th channel of the broadcasting service through the corresponding one of the first to n-th receivers where "n" and "m" are a natural number greater than or equal to 2;

(b) analyzing the first to n-th service provision information to determine a first number of times based on the number of times that each of the predetermined one or more channels is provided through each of the first to n-th receivers for a time period longer than or equal to a first threshold during a predetermined period and to determine a second number of times based on the number of times that each of the predetermined one or more channels is provided through each of the first to n-th receivers for a time period longer than or equal to the first threshold and shorter than or equal to a second threshold during the predetermined period; and (c) extracting bounce rate information of each of the predetermined one or more channels based on the first number of times and the second number of times.

<Supplementary Note 2>

The method of Supplementary note 1, wherein (b) includes:

(b-1) determining the first number of times by subtracting, from the number of times that each of the predetermined one or more channels is provided through each of the first to n-th receivers for the time period longer than or equal to the first threshold during the predetermined period, the number of times that each of the predetermined one or more channels is provided through each of the first to n-th receivers for the time period longer than or equal to the first threshold within a time period in which advertisement information is scheduled to each of the predetermined one or more channels, which is determined by comparing each of the first to n-th service provision information and scheduling information of each of the predetermined one or more channels, during the predetermined period; and (b-2) determining the second number of times by subtracting, from the number of times that each of the predetermined one or more channels is provided through each of the first to n-th receivers for the time period longer than or equal to the first threshold and shorter than or equal to the second threshold during the predetermined period, the number of times that each of the predetermined one or more channels is provided through each of the first to n-th receivers for the time period longer than or equal to the first threshold and shorter than or equal to the second threshold within the time period in which the advertisement information is scheduled to each of the predetermined one or more channels during the predetermined period.

<Supplementary Note 3>

The method of Supplementary note 1,1, wherein the predetermined one or more channels is a i-th channel among the first to m-th channels where i is a natural number greater than or equal to 1 and smaller than or equal to m.

<Supplementary Note 4>

The method of Supplementary note 1, wherein the bounce rate information of each of the predetermined one or more channels includes a ratio of the second number of times to the first number of times.

<Supplementary Note 5>

The method of Supplementary note 4, wherein the bounce rate information of each of the predetermined one or more channels further includes at least one of the first number of times, information on the predetermined period, and identification information of the corresponding one of the predetermined one or more channels.

<Supplementary Note 6>

The method of Supplementary note 1, further including:

(d) analyzing a j-th service provision information among the first to n-th service provision information where j is a natural number greater than or equal to 1 and smaller than or equal to n to determine a third number of times based on the number of times that each of the predetermined one or more channels is provided through a j-th receiver among the first to n-th receivers for a time period longer than or equal to the first threshold during the predetermined period and to determine a fourth number of times based on the number of times that each of the predetermined one or more channels is provided through each of the first to n-th receivers for a time period longer than or equal to the first threshold and shorter than or equal to the second threshold during the predetermined period; and (e) extracting bounce rate information of each of the predetermined one or more channels of the j-th receiver based on the third number of times and the fourth number of times.

<Supplementary Note 7>

The method of Supplementary note 6, wherein (d) includes:

(d-1) determining the third number of times by subtracting, from the number of times that each of the predetermined one or more channels is provided through the j-th receiver for the time period longer than or equal to the first threshold during the predetermined period, the number of times that each of the predetermined one or more channels is provided through the j-th receiver for the time period longer than or equal to the first threshold within a time period in which advertisement information is scheduled to each of the predetermined one or more channels, which is determined by comparing the j-th service provision information and scheduling information of each of the predetermined one or more channels, during the predetermined period; and (d-2) determining the fourth number of times by subtracting, from the number of times that each of the predetermined one or more channels is provided through the j-th receiver for the time period longer than or equal to the first threshold and shorter than or equal to the second threshold during the predetermined period, the number of times that each of the predetermined one or more channels is provided through the j-th receiver for the time period longer than or equal to the first threshold and shorter than or equal to the second threshold within the time period in which the advertisement information is scheduled to each of the predetermined one or more channels during the predetermined period.

<Supplementary Note 8>

The method of Supplementary note 6, wherein the predetermined one or more channels is a i-th channel among the first to m-th channels where i is a natural number greater than or equal to 1 and smaller than or equal to m.

<Supplementary Note 9>

The method of Supplementary note 6, wherein the bounce rate information of each of the predetermined one or more channels of the j-th receiver includes a ratio of the fourth number of times to the third number of times.

<Supplementary Note 10>

The method of Supplementary note 6, wherein the bounce rate information of each of the predetermined one or more channels of the j-th receiver includes at least one of the third number of times, information on the predetermined period, identification information of the j-th receiver, and identification information of the corresponding one of the one or more channels.

<Supplementary Note 11>

The method of Supplementary note 1, further including:

(f) analyzing broadcast schedules of the predetermined one or more channels and the first to n-th service provision information to determine a fifth number of times based on the number of times that a predetermined content is provided through each of the predetermined one or more channels in each of the first to n-th receivers for a time period longer than or equal to the first threshold during the predetermined period and to determine a sixth number of times based on the number of times that the predetermined content is provided through each of the predetermined one or more channels in each of the first to n-th receivers for a time period longer than or equal to the first threshold and shorter than or equal to the second threshold during the predetermined period; and (g) extracting bounce rate information of the predetermined content of each of the predetermined one or more channels based on the fifth number of times and the sixth number of times.

<Supplementary Note 12>

The method of Supplementary note 11, wherein the predetermined one or more channels is a i-th channel among the first to m-th channels where i is a natural number greater than or equal to 1 and smaller than or equal to m.

<Supplementary Note 13>

The method of Supplementary note 11, wherein (f) includes:

(f-1) determining the fifth number of times based on the number of times that the predetermined content is provided through each of the predetermined one or more channels for the time period longer than or equal to the first threshold from a selection of each of the predetermined one or more channels in each of the first to n-th receivers during the predetermined period; and (f-2) determining the sixth number of times based on the number of times that the predetermined content is provided through each of the predetermined one or more channels for the time period longer than or equal to the first threshold and shorter than or equal to the second threshold from the selection of each of the predetermined one or more channels in each of the first to n-th receivers during the predetermined period.

<Supplementary Note 14>

The method of Supplementary note 13, wherein the bounce rate information of the predetermined content provided through each of the predetermined one or more channels includes a ratio of the sixth number of times to the fifth number of times.

25

<Supplementary Note 15>

The method of Supplementary note 1, further including:

(h) analyzing a j-th service provision information among the first to n-th service provision information where j is a natural number greater than or equal to 1 and smaller than or equal to n to determine a seventh number of times based on the number of times that a predetermined content is provided through each of the predetermined one or more channels in a j-th receiver among the first to n-th receivers for a time period longer than or equal to the first threshold during the predetermined period and to determine an eighth number of times based on the number of times that the predetermined content is provided through each of the predetermined one or more channels in the j-th receiver for a time period longer than or equal to the first threshold and shorter than or equal to the second threshold during the predetermined period; and (i) extracting bounce rate information of the predetermined content provided through each of the one or more channels in the j-th receiver based on the seventh number of times and the eighth number of times.

<Supplementary Note 16>

The method of Supplementary note 15, wherein the predetermined one or more channels is a i-th channel among the first to m-th channels where i is a natural number greater than or equal to 1 and smaller than or equal to m.

<Supplementary Note 17>

The method of Supplementary note 15, wherein (h) includes:

(h-1) determining the seventh number of times based on the number of times that the predetermined content is provided through each of the predetermined one or more channels for the time period longer than or equal to the first threshold from a selection of each of the predetermined one or more channels in the j-th receiver among the first to n-th receivers during the predetermined period; and (h-2) determining the eighth number of times based on the number of times that the predetermined content is provided through each of the predetermined one or more channels for the time period longer than or equal to the first threshold and shorter than or equal to the second threshold from the selection of each of the predetermined one or more channels in the j-th receiver during the predetermined period.

<Supplementary Note 18>

The method of Supplementary note 17, wherein the bounce rate information of the predetermined content provided through each of the predetermined one or more channels in the j-th receiver includes a ratio of the eighth number of times to the seventh number of times.

<Supplementary Note 19>

The method of Supplementary note 1, wherein the "n" is one of the total number of receivers subscribed to the broadcasting service and the predetermined number of receivers among all the receivers subscribed to the broadcasting service, and the "m" is one of the total number of channels of the broadcasting service and the predetermined number of channels among all the channels of the broadcasting service.

<Supplementary Note 20>

The method of Supplementary note 1, wherein the first threshold is determined while considering a delay time for signal processing of each of the first to n-th receivers and the second threshold is dynamically determined based on identification information of each of the predetermined one or more channels.

26

DESCRIPTION OF REFERENCE NUMERALS

100: bounce rate measuring apparatus
110: processor
130: memory
150: program
200: receiver
300: channel

What is claimed is:

1. A bounce rate measuring apparatus for a broadcasting service comprising:

one or more processors;

one or more memories; and one or more programs that are stored in the one or more memories and executed by the one or more processors, wherein the one or more programs include:

a first instruction that, when executed, respectively receives a first service provision information to an n-th service provision information from a first receiver to an n-th receiver each of which receives and provides the broadcasting service wherein each of the first to n-th service provision information includes at least information on the provision of predetermined one or more channels among a first channel to an m-th channel of the broadcasting service through each of the first to n-th receivers where "n" and "m" are a natural number greater than or equal to 2;

a second instruction that, when executed, analyzes the first to n-th service provision information to determine a first number of times based on the number of times that each of the predetermined one or more channels is provided through each of the first to n-th receivers for a time period longer than or equal to a first threshold during a predetermined period and to determine a second number of times based on the number of times that each of the predetermined one or more channels is provided through each of the first to n-th receivers for a time period longer than or equal to the first threshold and shorter than or equal to a second threshold during the predetermined period; and a third instruction that, when executed, extracts bounce rate information of each of the predetermined one or more channels based on the first number of times and the second number of times.

2. The bounce rate measuring apparatus of claim 1, wherein the second instruction includes:

a first sub-instruction that, when executed, determines the first number of times by subtracting, from the number of times that each of the predetermined one or more channels is provided through each of the first to n-th receivers for the time period longer than or equal to the first threshold during the predetermined period, the number of times that each of the predetermined one or more channels is provided through each of the first to n-th receivers for the time period longer than or equal to the first threshold within a time period in which advertisement information is scheduled to each of the predetermined one or more channels, which is determined by comparing each of the first to n-th service provision information and scheduling information of each of the predetermined one or more channels, during the predetermined period; and a second sub-instruction that, when executed, determines the second number of times by subtracting, from the number of times that each of the predetermined one or more channels is provided through each of the first to n-th receivers for the time period longer than or equal to the first threshold and shorter than or equal to the second threshold during the predetermined period, the number of times that each of the predetermined one or more channels is provided through each of the first to n-th receivers for the time period longer than or equal to the first threshold and shorter than or equal to the second threshold within the time period in which the advertisement information is scheduled to each of the predetermined one or more channels during the predetermined period.

3. The bounce rate measuring apparatus of claim 1, wherein the predetermined one or more channels is a i-th channel among the first to m-th channels where i is a natural number greater than or equal to 1 and smaller than or equal to m.

4. The bounce rate measuring apparatus of claim 1, wherein the bounce rate information of each of the predetermined one or more channels includes a ratio of the second number of times to the first number of times.

5. The bounce rate measuring apparatus of claim 4, wherein the bounce rate information of each of the predetermined one or more channels further includes at least one of the first number of times, information on the predetermined period, and identification information of each of the predetermined one or more channels.

6. The bounce rate measuring apparatus of claim 1, wherein the one or more programs further include:
   a fourth instruction that, when executed, analyzes a j-th service provision information among the first to n-th service provision information where j is a natural number greater than or equal to 1 and smaller than or equal to n to determine a third number of times based on the number of times that each of the predetermined one or more channels is provided through a j-th receiver among the first to n-th receivers for a time period longer than or equal to the first threshold during the predetermined period and to determine a fourth number of times based on the number of times that each of the predetermined one or more channels is provided through each of the first to n-th receivers for a time period longer than or equal to the first threshold and shorter than or equal to the second threshold during the predetermined period; and
   a fifth instruction that, when executed, extracts bounce rate information of each of the predetermined one or more channels of the j-th receiver based on the third number of times and the fourth number of times.

7. The bounce rate measuring apparatus of claim 6, wherein the fourth instruction includes:
   a third sub-instruction that, when executed, determines the third number of times by subtracting, from the number of times that each of the predetermined one or more channels is provided through the j-th receiver for the time period longer than or equal to the first threshold during the predetermined period, the number of times that each of the predetermined one or more channels is provided through the j-th receiver for the time period longer than or equal to the first threshold within a time period in which advertisement information is scheduled to each of the predetermined one or more channels, which is determined by comparing the j-th service provision information and scheduling information of each of the predetermined one or more channels, during the predetermined period; and
   a fourth sub-instruction that, when executed, determines the fourth number of times by subtracting, from the number of times that each of the predetermined one or more channels is provided through the j-th receiver for the time period longer than or equal to the first threshold and shorter than or equal to the second threshold during the predetermined period, the number of times that each of the predetermined one or more channels is provided through the j-th receiver for the time period longer than or equal to the first threshold and shorter than or equal to the second threshold within the time period in which the advertisement information is scheduled to each of the predetermined one or more channels during the predetermined period.

8. The bounce rate measuring apparatus of claim 6, wherein the predetermined one or more channels is a i-th channel among the first to m-th channels where i is a natural number greater than or equal to 1 and smaller than or equal to m.

9. The bounce rate measuring apparatus of claim 6, wherein the bounce rate information of each of the predetermined one or more channels of the j-th receiver includes a ratio of the fourth number of times to the third number of times.

10. The bounce rate measuring apparatus of claim 6, wherein the bounce rate information of each of the predetermined one or more channels of the j-th receiver includes at least one of the third number of times, information on the predetermined period, identification information of the j-th receiver, and identification information of each of the one or more channels.

11. The bounce rate measuring apparatus of claim 1, wherein the one or more programs further include:
    a sixth instruction that, when executed, analyzes broadcast schedules of the predetermined one or more channels and the first to n-th service provision information to determine a fifth number of times based on the number of times that a predetermined content is provided through each of the predetermined one or more channels in each of the first to n-th receivers for a time period longer than or equal to the first threshold during the predetermined period and to determine a sixth number of times based on the number of times that the predetermined content is provided through each of the predetermined one or more channels in each of the first to n-th receivers for a time period longer than or equal to the first threshold and shorter than or equal to the second threshold during the predetermined period; and
    a seventh instruction that, when executed, extracts bounce rate information of the predetermined content of each of the predetermined one or more channels based on the fifth number of times and the sixth number of times.

12. The bounce rate measuring apparatus of claim 11, wherein the predetermined one or more channels is a i-th channel among the first to m-th channels where i is a natural number greater than or equal to 1 and smaller than or equal to m.

13. The bounce rate measuring apparatus of claim 11, wherein the sixth instruction includes:
    a fifth sub-instruction that, when executed, determines the fifth number of times based on the number of times that the predetermined content is provided through each of the predetermined one or more channels for the time period longer than or equal to the first threshold from a selection of each of the predetermined one or more channels in each of the first to n-th receivers during the predetermined period; and
    a sixth sub-instruction that, when executed, determines the sixth number of times based on the number of times that the predetermined content is provided through each of the predetermined one or more channels for the time period longer than or equal to the first threshold and shorter than or equal to the second threshold from the selection of each of the predetermined one or more channels in each of the first to n-th receivers during the predetermined period.

14. The bounce rate measuring apparatus of claim 13, wherein the bounce rate information of the predetermined content provided through each of the predetermined one or more channels includes a ratio of the sixth number of times to the fifth number of times.

15. The bounce rate measuring apparatus of claim 1, wherein the one or more programs further include:
an eighth instruction that, when executed, analyzes a j-th service provision information among the first to n-th service provision information where j is a natural number greater than or equal to 1 and smaller than or equal to n to determine a seventh number of times based on the number of times that a predetermined content is provided through each of the predetermined one or more channels in a j-th receiver among the first to n-th receivers for a time period longer than or equal to the first threshold during the predetermined period and to determine an eighth number of times based on the number of times that the predetermined content is provided through each of the predetermined one or more channels in the j-th receiver for a time period longer than or equal to the first threshold and shorter than or equal to the second threshold during the predetermined period; and
a ninth instruction that, when executed, extracts bounce rate information of the predetermined content provided through each of the one or more channels in the j-th receiver based on the seventh number of times and the eighth number of times.

16. The bounce rate measuring apparatus of claim 15, wherein the predetermined one or more channels is a i-th channel among the first to m-th channels where i is a natural number greater than or equal to 1 and smaller than or equal to m.

17. The bounce rate measuring apparatus of claim 15, wherein the eighth instruction includes:
a seventh sub-instruction that, when executed, determines the seventh number of times based on the number of times that the predetermined content is provided through each of the predetermined one or more channels for the time period longer than or equal to the first threshold from a selection of each of the predetermined one or more channels in the j-th receiver among the first to n-th receivers during the predetermined period; and
an eighth sub-instruction that, when executed, determines the eighth number of times based on the number of times that the predetermined content is provided through each of the predetermined one or more channels for the time period longer than or equal to the first threshold and shorter than or equal to the second threshold from the selection of each of the predetermined one or more channels in the j-th receiver during the predetermined period.

18. The bounce rate measuring apparatus of claim 17, wherein the bounce rate information of the predetermined content provided through each of the predetermined one or more channels in the j-th receiver includes a ratio of the eighth number of times to the seventh number of times.

19. The bounce rate measuring apparatus of claim 1, wherein the "n" is one of the total number of receivers subscribed to the broadcasting service and the predetermined number of receivers among all the receivers subscribed to the broadcasting service, and the "m" is one of the total number of channels of the broadcasting service and the predetermined number of channels among all the channels of the broadcasting service.

20. The bounce rate measuring apparatus of claim 1, wherein the first threshold is determined while considering a delay time for signal processing of each of the first to n-th receivers and the second threshold is dynamically determined based on identification information of each of the predetermined one or more channels.

* * * * *